United States Patent [19]
Hall, III

[11] Patent Number: 5,378,208
[45] Date of Patent: Jan. 3, 1995

[54] REVERSING ASSEMBLY FOR MULTI-SPEED TRANSMISSION

[75] Inventor: Arthur Hall, III, Cicero, Ind.

[73] Assignee: General Motors Corporation, Detroit, Mich.

[21] Appl. No.: 73,236

[22] Filed: Jun. 7, 1993

[51] Int. Cl.⁶ .......................... F16H 57/10; F16H 3/66
[52] U.S. Cl. ...................................... 475/276; 475/219
[58] Field of Search ............... 475/212, 269, 271, 275, 475/276, 279, 317, 319

[56] References Cited

U.S. PATENT DOCUMENTS 4,038,887  8/1977  Murakami et al. ............. 475/276 X

FOREIGN PATENT DOCUMENTS

| 0134049 | 8/1982 | Japan | 475/276 |
|---|---|---|---|
| 0026351 | 1/1990 | Japan | 475/276 |
| 0076954 | 3/1990 | Japan | 475/276 |
| 4140540 | 5/1992 | Japan | 475/276 |
| 2023752 | 1/1980 | United Kingdom | 475/279 |

*Primary Examiner*—Edward K. Look
*Assistant Examiner*—Hoang Nguyen
*Attorney, Agent, or Firm*—Donald F. Scherer

[57] ABSTRACT

An assembly for receiving input power and delivering that power to a range pack transmission in either a forward or a reverse mode. One or more first gears are drivingly connected to the source of input power. One or more second planet gears are also drivingly connected to the source of input power. The first and second planet gears are meshingly interconnected. The first planet gears meshingly engage a ring gear that may be selectively grounded to effect reverse rotation of the sun gear with respect to the carrier. The second planet gear meshingly engages the sun gear which serves as an output to deliver power from the reversing assembly to a range pack transmission.

9 Claims, 1 Drawing Sheet

REVERSING ASSEMBLY FOR MULTI-SPEED TRANSMISSION

The invention herein described was made in the course of work under a contract or sub-contract thereunder with the Department of the Army.

TECHNICAL FIELD

The present invention relates generally to vehicular transmissions. More particularly, the present invention relates to reversing assemblies for vehicular transmissions. Specifically, the present invention relates to multi-speed reversing assemblies disposed between an input splitter and a multi-speed range pack transmission.

BACKGROUND OF THE INVENTION

Automatic and manual power transmissions for vehicles are well-known. Many automatic transmissions include a system of planetary gear sets connected between a torque converter and the output shaft of the transmission. Each planetary gear set includes a sun gear, a ring gear and a plurality of planet gears, supported on a carrier, operatively to connect the sun and ring gears. Various torque transfer devices in the nature of clutches and brakes are utilized in combination with the planetary gear sets to control the rotation of one or more components thereof and thereby produce the desired drive ratios.

Particularly in off-road, and military, vehicle applications, it is desirable to provide multiple reverse drive ratios as well as multiple forward drive ratios. In certain vehicles, one reverse ratio is required, or desired, to be at least equal to fifty percent of the top forward ratio.

Range packs are frequently employed in vehicular transmissions to provide multiple forward and reverse ratios. The range pack often comprises compounded planetary gear sets which provide, for example, four drive gear ratios. An input splitter is typically used in combination with a range pack to permit the same range pack to provide four additional speeds as a result of the gear reducing assemblies within the input splitter.

Most of the range packs currently being used in vehicular transmissions have at least one rotating clutch (usually two) ahead of a series of two or more compounded planetary sets. Selectively applied stationary brakes ground predetermined elements of the planetary gear sets and provide a reaction such that distinct ratios between input and output are generated when a predetermined brake is applied together with a clutch. If there is more than one clutch, the application of both clutches without any brakes being applied normally generates a 1:1 ratio.

The well known reversing set described in U.S. Pat. No. 5,112,285 which is owned by General Motors Corporation, and which is incorporated herein by reference, employs a compound planetary set, a brake, and a clutch. With the carrier as the input, the reversing set may be locked to rotate as a unit when the clutch is applied. When the ring gear of the compound planetary set is grounded, as by a torque transfer device in the nature of a brake, the sun gear of the compound planetary set rotates in a direction opposite to the carrier. As such, the reverse ratio may be approximated by the following mathematical expression:

$$\frac{(N_s - N_r)}{N_s} \qquad (1)$$

where,
$N_s$=number of teeth in the sun gear
$N_r$=number of teeth in the ring gear If the sun gear has half the number of teeth as that of the reverse assembly ring gear, then the reverse ratio will be $1:-1$. If this reversing set is installed in front of a range pack, then an equal number of forward and reverse gears with the same ratios may be generated.

SUMMARY OF THE INVENTION

It is, therefore, a primary object of the present invention to provide a novel multi-speed reversing assembly which—when disposed between an input splitter and range pack transmission—is capable of generating multiple reverse ratios without the need for a clutch in the reversing set, as required in conventional transmission gear arrangements.

It is another object of the present invention to provide a reversing assembly, as above, wherein the removal of the clutch from the reversing set permits the generation of adequate reverse ratios to meet commercial transmission requirements.

It is a further object of the present invention to provide a reversing assembly, as above, that employs a compound planet gear means and one additional torque transfer device in the nature of a brake by which to ground the ring gear in order to generate multiple reverse ratios.

It is still another object of the present invention to provide a reversing assembly, as above, that is not only capable of being interposed between an input splitter and a two-planetary, four-speed transmission but which is also applicable to other drive train arrangements with at least one clutch at the input of the range pack transmission.

These and other objects of the invention, as well as the advantages thereof over existing and prior art forms, which will be apparent in view of the following detailed specification, are accomplished by means hereinafter described and claimed.

In general, a reversing assembly embodying the concepts of the present invention utilizes an input means for delivering power to the reversing assembly. A first planet gear means is drivingly connected to the input means. A second planet gear means is also drivingly connected to the input means. The first and second planet gear means are meshingly interconnected. An output means is provided for delivering power from the reversing assembly to a range pack transmission. The output means is drivingly connected to at least the second planet gear means.

A selectively engageable brake means cooperates with the first planet gear means such that when the brake means is engaged, the output gear means rotates in a direction opposite to the rotation of said input means.

The range pack transmission provides a plurality of drive ratios.

To acquaint persons skilled in the arts most closely related to the present invention, one preferred embodiment of a reversing assembly that illustrates a best mode now contemplated for putting the invention into practice is described herein by, and with reference to, the annexed drawings that form a part of the specification. The exemplary reversing assembly is described in detail without attempting to show all of the various forms and modification in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
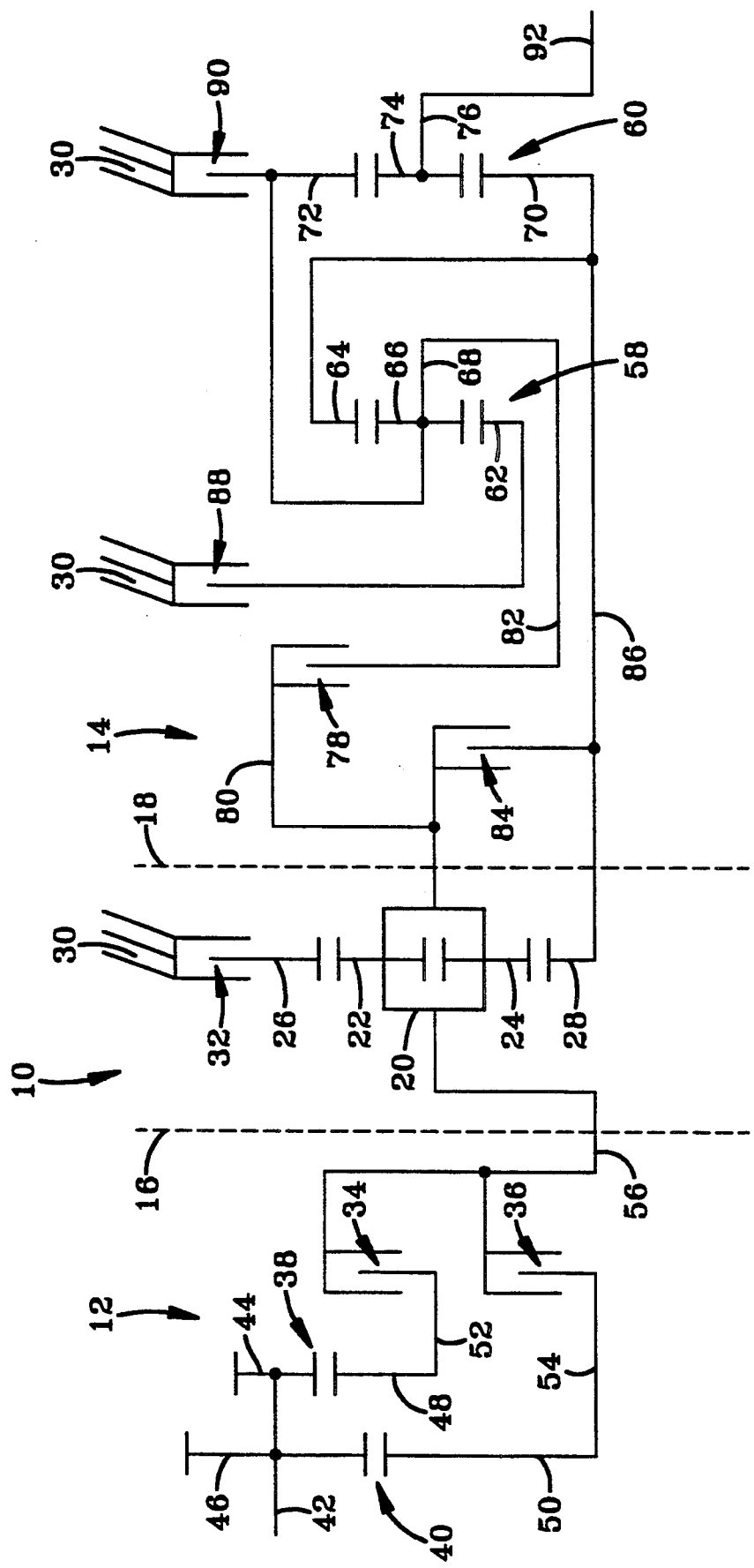
FIG. 1 is a schematic representation of a power transmission gear arrangement according to the present invention.

One representative form of reversing assembly embodying the concepts of the present invention is designated generally by the numeral 10 on the accompanying drawings. The representative reversing assembly 10 is disposed between an input splitter assembly 12 and a four speed range pack transmission 14. The reversing assembly 10 is that portion of the overall transmission system which appear between dotted lines 16 and 18. Input splitter assembly 12 preferably is one which is capable of generating both a low and a high input speed so as to permit the doubling of the available drive ratios. The speed range pack assembly 14 is preferably one which is capable of generating four distinct forward ratios by sequentially engaging the proper torque transfer devices in the nature of clutches and brakes. By utilizing an input splitter 12 in combination with the range pack assembly 14 the latter is capable of providing eight distinct drive ratios.

The reversing assembly 10 preferably incorporates a carrier 20 from which compounded planet gear means are operatively supported. That is, first planet gear means 22 and second planet gear means 24 are operatively supported by the common carrier 20. The first and second planet gear means 22 and 24 are not only meshingly engaged with each other, but the first planet gear means 22 also meshingly engage a ring gear 26, while the second planet gear means 24 also meshingly engages a sun gear 28. The ring gear 26 is selectively affixed to ground 30 by virtue of a torque transfer device in the nature of a brake 32. By virtue of the foregoing compounded planet gear means, arrangement, when the brake 32 is engaged, the sun gear 28 rotates in a direction opposite to the direction in which the carrier 20 is rotated.

Although not shown in the drawings, it should be recognized by one skilled in the art that the first and second planet gear means 22 and 24 can each comprise a plurality of individual pinion gears (e.g., each planet gear means may, for example, employ three pinion gears) to accomplish the reversing ratios according to the present invention as will be hereinafter more fully discussed.

By interposing the reversing assembly 10 between the input splitter assembly 12 and the range pack transmission 14 a plurality of forward and reverse drive ratios may be conveniently provided.

Although any conventional input splitter may be used in accordance with this invention, the input splitter assembly 12 depicted is a multi-clutch assembly capable of generating both low and high output speeds. Specifically, the input splitter assembly 12 depicted doubles the available output ratios by the use of two torque transfer devices in the nature of clutches 34 and 36 selectively to connect the input through one or the other of the two gear reducer assemblies 38 and 40.

A power input shaft 42 is continuously connected to drive both the input gears 44 and 46 of the first and second reducer assemblies 38 and 40, respectively. The input gears 44 and 46 meshingly engage the output gears 48 and 50 in the respective reducer assemblies 38 and 40. As is known to the art, the configuration of the engaged gears 44 and 48 as well as the engaged gears 46 and 50 provide two distinct speed ratios to the respective shaft means 52 and 54 on which the output gears 48 and 50 are respectively supported.

The input shaft 24 delivers power from the engine, or other source of motive power, to both low speed clutch 34 and high speed clutch 36 through the respective first and second gear reducer assemblies 38 and 40. Power is delivered to the low speed clutch 34 by virtue of the shaft 52, and to the high speed clutch 36 by virtue of shaft 54. Both the high speed clutch 36 and the low speed clutch 34 are connected to a first hub shaft 56 so that the rotational speed of the carrier 20 in relation to the rotational speed of the input shaft 42 will be determined by which clutch 34 or 36 is engaged.

The range pack transmission 14 is depicted as being a four-speed arrangement that utilizes compounded first and second planetary gear sets 58 and 60. The first planetary gear set 58 has a sun gear 62 and a ring gear 64 that are operatively connected by planet gears 66 supported from a carrier 68. The second planetary gear set 60 similarly has a sun gear 70 and a ring gear 72 that are operatively connected by planet gears 74 supported on a carrier 76. The carrier 68 of the first planetary gear set 58 is the input element of the compounded planetary gear sets 58 and 60, and the carrier 76 of the second planetary gear set 60 is the output element of the compounded planetary gear sets 58 and 60.

The carrier 20 of the reversing assembly 10 is selectively connectable to the carrier 68 of the first planetary gear set 58 through a torque transfer device in the nature of an overdrive clutch 78 that is operatively connected between the clutch housing—represented at 80—and a second hub shaft 82 to which the carrier 68 is attached. The carrier 20 of the reversing assembly 10 is also selectively, and simultaneously, connectable through a torque transfer device in the nature of a primary rotating clutch 84 to the third hub shaft 86. As represented in the drawing, the third hub shaft 86, which may be disposed concentrically interiorly of the second hub shaft 82, is connected to: (a) the sun gear 28 of the reversing assembly 10; (b) the ring gear 64 of the first planetary gear set 58 in the range pack transmission 14; and, (c) the sun gear 70 of the second planetary gear set 60 in the range pack transmission 14.

The sun gear 62 of the first planetary gear set 58 is selectively connected to ground 30 by virtue of a torque transfer device in the nature of a brake 88. The carrier 68 of the first planetary gear set 58 is continuously connected to the ring gear 72 of the second planetary gear set 60, and both are selectively connectable to ground 30 through a torque transfer device in the nature of a brake 90. The carrier 76 in the second planetary gear set 60 thus serves as the output element of the compounded planetary gear sets 58 and 60, and it is, therefore, operatively connected to the output shaft 92 of the range pack transmission 14.

To operate at high input speed/low output speed ratios, power is delivered to input splitter 12 via input shaft 42. The input shaft 42 rotates pinion gear 44 that meshes with output gear 48. The shaft 52 on which the output gear 48 is mounted thereby rotates with the output gear 48. In the low speed mode of operation, low speed clutch 34 effects a driving connection between the output gear 48 and the hub shaft 56 to drive the carrier 20 of the reversing assembly 10 at the same speed and in the same direction as the output gear 48.

When the primary rotating clutch 84 is engaged, and the brake 32 is disengaged, the planet gears 22 and 24, which are drivingly connected to the ring gear 26 and the sun gear 28, respectively, rotate the sun gear 28 in the same direction as the carrier 20. The sun gear 28 rotates in the same direction as the carrier 20 inasmuch as they are connected by the primary clutch 84. Thus, when the clutch 84 is engaged, the reversing assembly 10 rotates as a unit, and at a 1:1 ratio.

If neither the primary rotating clutch 84 nor the brake 32 are engaged, the components rotate at relative speeds determined by the range pack assembly 14. In this situation the range pack assembly 14 is driven through carrier 20 and the clutch housing 80 which is secured to one side of the overdrive clutch 78. It is often desirable to incorporate the carrier 20 within the clutch housing 80 to minimize the size and weight of the components.

In the range pack transmission 14 depicted, the lowest, or first, drive ratio is achieved by engaging the primary rotating clutch 84 and the brake 90. The second drive ratio is progressively effected by releasing the brake 90 and engaging the brake 88. The third drive ratio operates when the brake 88 is progressively released and the overdrive clutch 78 is engaged. This third drive ratio is the direct drive achieved in such an arrangement when no brake is employed and both clutches are engaged. As such, in the this drive range the rotational velocity of the first hub shaft 56 is equal to the rotational velocity of the output shaft 92. The fourth, or overdrive, ratio is accomplished by releasing the rotating clutch 84 and engaging the brake 88.

If low input/high output speed ratios are desired, then high speed clutch 36 is engaged and power is supplied from input shaft 42 to the drive gear 46. The drive gear 46 rotates the output gear 50 and the shaft 54 on which it is secured. The clutch 36 is rotatably connected between the output shaft 54 and the first hub shaft 56. Thereafter, the system operates in the same fashion as the low speed mode discussed above.

The reverse mode of operation is occasioned by engaging the brake 32, which grounds the ring gear 26 and one of the brakes in the range pack transmission 14. Under that condition both the sun gear 28 and the third hub shaft 86 rotate in a direction opposite to rotation of the carrier 20 and clutch housing 80. Hence, the reverse ranges are generated by engaging the brake 32 in combination with the appropriate brakes 88 or 90 in the range pack assembly 14. When brake 90 is engaged, the reverse ratio is equal to the ratio through reversing assembly 10 times the lowest ratio provided by the range pack transmission 14. Because the brake 90 is used to achieve the lowest drive ratio, the reverse low range can be made numerically the same as the forward low range by using a reversing assembly 10 with a 1:−1 ratio. As such, reverse assembly 10 is also capable of making the second reverse ratio numerically equal to second forward ratio. In general, if a forward range is generated by transferring all of the power through hub shaft 86 attached to sun gear 28, then the corresponding reverse range can be made numerically equal. This ability to have equal forward and reverse ratios is very desirable.

It should be appreciated that the range pack transmission 14 generates four distinct forward ratios by selectively engaging the proper clutches and brakes within the range pack transmission 14. Hence, the splitter 12 permits a total of eight distinct ratios. However, it may be desirable to employ only a total of six ratios in order to avoid double transitions and/or to eliminate ratios that are too close for an orderly stepping of the drive ratios.

If part of the power in a particular forward range is delivered through the reversible shaft 86, and part is delivered through another path, such as the hub shaft 82, the resulting reverse ratio will not be numerically equal to the corresponding forward ratio. The same would be true if all the power in the forward range by-passes the reversible hub shaft 86. In that situation each of the drive ratios would have to be examined to determine what the resulting ratio is and if, in fact, it is a reverse ratio. In the embodiment depicted, engagement of the brake 80 and the overdrive clutch 78 results in a forward ratio that falls between that provided by the lowest drive range and the second drive range.

While only a preferred embodiment of my present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a reversing assembly embodying the concepts of the present invention is capable of generating multiple reverse ratios without the need for a clutch in the reversing set, as required in conventional transmission gear arrangements produces, but also that the other objects of the invention can be likewise accomplished.

The invention claimed is:

1. A reversing assembly for a power transmission, the reversing assembly comprising:
   input means for delivering power to the reversing assembly;
   a carrier connected to said input means;
   compounded planet gear means having first planet gear meshingly engaging second planet means, said compounded planet gear means supported on said carrier;
   a ring gear in the reversing assembly;
   said first planet gear means meshingly engaging said ring gear; a sun gear
   in the reversing assembly for delivering output therefrom;
   said second planet gear means meshingly engaging said sun gear; and,
   a selectively engageable brake means cooperating with said ring gear such that when said brake means is engaged said sun gear rotates in a direction opposite to the rotation of said input means.

2. A reversing assembly for a power transmission, the reversing assembly comprising:
   input means for delivering power to the reversing assembly;
   first planet gear means drivingly connected to said input means;

second planet gear means drivingly connected to said input means;

said first and second planet gear means meshingly interconnected;

output means having a sun gear for delivering power from the reversing assembly;

said output means drivingly connected to at least said second planet gear means; and, a selectively engageable brake means cooperating with said first planet gear means such that when said brake means is engaged said sun gear rotates in a direction opposite to the rotation of said input means.

3. A reversing assembly, as set forth in claim 2, further comprising:

a ring gear disposed between said first planetary gear means and said brake means.

4. A reversing assembly, as set forth in claim 2, wherein:

said input means is a carrier.

5. A reversing assembly, as set forth in claim 2, wherein;

said carrier is drivingly connected to a range pack transmission through selectively operable torque transfer means.

6. A reversing assembly, as set forth in claim 5, further comprising:

said sun gear being in the reversing assembly;

said sun gear meshingly engaging said second planet gear means; and, said sun gear being drivingly connected to a range pack transmission.

7. In combination, a reversing assembly, an input splitter for receiving power and delivering power to the reversing assembly, and a range pack transmission for receiving power from the reversing assembly and providing selective drive ratios to an output;

the range pack assembly having at least one selectively engageable clutch means operatively connected to the reversing assembly, at least two planetary gear means, brake means, and range pack output means for delivering power from said range pack assembly;

the reversing assembly comprising:

first planet gear means drivingly connected to the input splitter;

second planet gear means drivingly connected to the input splitter and meshingly engaged with said first planet gear means;

output having a sun gear means drivingly connected to at least said second planet gear means; and, a selectively engageable reversing assembly brake means cooperating with said first planet gear means such that when said reversing assembly brake means is engaged said sun gear rotates in a direction opposite to the rotation of said input splitter assembly.

8. A combination, as set forth in claim 7, further comprising:

a ring gear incorporated in said reversing assembly and operatively interposed between said first planet gear means and said reversing assembly brake means.

9. A combination, as set forth in claim 8, further comprising:

said sun gear incorporated in said reversing assembly and operatively interposed between said second planet gear means and the range pack transmission.

* * * * *